United States Patent
Horita et al.

(10) Patent No.: US 10,809,189 B2
(45) Date of Patent: Oct. 20, 2020

(54) OPTICAL MEASUREMENT DEVICE AND OPTICAL MEASUREMENT METHOD

(71) Applicant: HAMAMATSU PHOTONICS K.K., Hamamatsu-shi, Shizuoka (JP)

(72) Inventors: Kazuki Horita, Hamamatsu (JP); Yoichi Kawada, Hamamatsu (JP); Atsushi Nakanishi, Hamamatsu (JP); Kazuue Fujita, Hamamatsu (JP); Hironori Takahashi, Hamamatsu (JP); Hiroshi Satozono, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 16/285,274

(22) Filed: Feb. 26, 2019

(65) Prior Publication Data
US 2019/0271642 A1 Sep. 5, 2019

(30) Foreign Application Priority Data

Mar. 2, 2018 (JP) .................. 2018-037300

(51) Int. Cl.
| | |
|---|---|
| *G01N 21/35* | (2014.01) |
| *G01N 21/3586* | (2014.01) |
| *G01J 3/42* | (2006.01) |
| *G01N 21/552* | (2014.01) |
| *G01N 21/25* | (2006.01) |
| *G01N 21/31* | (2006.01) |
| *G01N 21/3581* | (2014.01) |

(52) U.S. Cl.
CPC .......... *G01N 21/3586* (2013.01); *G01J 3/42* (2013.01); *G01N 21/255* (2013.01); *G01N 21/35* (2013.01); *G01N 21/552* (2013.01); *G01J 2003/425* (2013.01); *G01N 21/3581* (2013.01); *G01N 2021/3155* (2013.01)

(58) Field of Classification Search
CPC ...... G01N 21/3586; G01N 21/255; G01J 3/42
See application file for complete search history.

(56) References Cited

U.S. PATENT DOCUMENTS

| | | | | |
|---|---|---|---|---|
| 2008/0149819 | A1* | 6/2008 | Zhdaneev | G01N 21/3581 250/255 |
| 2010/0195092 | A1* | 8/2010 | Ohtake | G01B 11/0666 356/51 |

(Continued)

OTHER PUBLICATIONS

Sasaki, Testuo et al., "Frequency Stabilized GaP Continuous-Wave Terahertz Signal Generator for High-Resolution Spectroscopy," Optics and Photonics Journal, 2014, vol. 4, No. 1, pp. 8-13.

*Primary Examiner* — Hugh Maupin
(74) *Attorney, Agent, or Firm* — Faegre Drinker Biddle & Reath LLP

(57) ABSTRACT

An optical measurement device includes a light source configured to output a terahertz wave and coaxial light having a wavelength different from the wavelength of the terahertz wave, coaxially with the terahertz wave; an intensity modulation unit configured to perform intensity modulation of at least the terahertz wave of the terahertz wave and the coaxial light in a predetermined modulation frequency; and a light detection unit configured to synchronously detects each of the terahertz wave and the coaxial light which have acted on a measurement subject via the intensity modulation unit based on the modulation frequency.

9 Claims, 14 Drawing Sheets

(56) References Cited

U.S. PATENT DOCUMENTS

2015/0241348 A1* 8/2015 Ouchi ................ G01N 21/3586
   250/341.1
2017/0016813 A1* 1/2017 Wagner .............. G01N 21/3577

* cited by examiner

*Fig.4*
REFERENCE SIGNAL R1 FOR TERAHERTZ WAVES 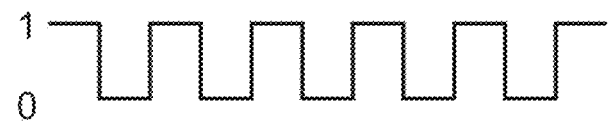
REFERENCE SIGNAL R2 FOR COAXIAL LIGHT 

Fig.9

| WINDOW MATERIAL | | TRANSMISSION FACTOR | THICKNESS (mm) | THE NUMBER OF MATERIALS | PEAK POWER (mW) | AFTER TRANSMISSION (mW) |
|---|---|---|---|---|---|---|
| z-cut quartz | THz@2.5THz | 0.73 | 1 | 1 | 1 | 0.73 |
| | MIR@10um | SUBSTANTIALLY ZERO | | | 10000 | 0 |
| Tsurupica | THz@2.5THz | 0.8 | 2 | 1 | 1 | 0.8 |
| | MIR@10um | SUBSTANTIALLY ZERO | | | 10000 | 0 |

Fig.10

| WINDOW MATERIAL | | TRANSMISSION FACTOR | THICKNESS (mm) | THE NUMBER OF MATERIALS | PEAK POWER (mW) | AFTER TRANSMISSION (mW) | THz/MIR | ≦ 10⁻³ |
|---|---|---|---|---|---|---|---|---|
| HRFZ | MIR@10um | 0.45 | 1 | 7 | 10000 | 37.36695 | 0.000157 | OK |
| | THz@2.5THz | 0.48 | | | 1 | 0.005871 | | |
| DIAMOND | MIR@10um | 0.82 | 1.2 | 25 | 10000 | 70.04003 | 0.0001 | OK |
| | THz@2.5THz | 0.82 | | | 1 | 0.007004 | | |
| ZnSe | MIR@10um | 0.65 | 1 | 12 | 10000 | 56.88009 | 2.76E-09 | OK |
| | THz@2.5THz | 0.271 | | | 1 | 1.57E-07 | | |

Fig. 11

| WINDOW MATERIAL 13A | WINDOW MATERIAL 13B | TRANSMISSION PEAK INTENSITY OF COAXIAL LIGHT I IN WINDOW MATERIAL 13B/ TRANSMISSION PEAK INTENSITY OF TERAHERTZ WAVE T IN WINDOW MATERIAL 13A | CONDITION 2) $\leqq 10^2$ |
|---|---|---|---|
| Z-CUT QUARTZ | HRFZ-Si | 51.2 | OK |
| | DIAMOND | 95.9 | OK |
| | ZnSe | 77.9 | OK |

*Fig.12*
REFERENCE SIGNAL R1
FOR TERAHERTZ WAVES
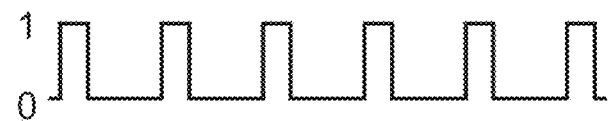
REFERENCE SIGNAL R2
FOR COAXIAL LIGHT
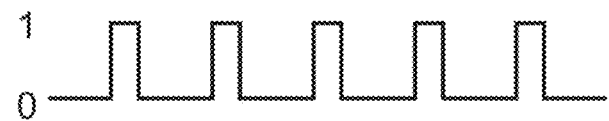

OPTICAL MEASUREMENT DEVICE AND OPTICAL MEASUREMENT METHOD

TECHNICAL FIELD

The present disclosure relates to an optical measurement device and an optical measurement method

BACKGROUND

As a light source applied to an optical measurement device, for example, Patent Literature 1 (Japanese Unexamined Patent Publication No. 2017-33981) discloses a quantum cascade laser. This quantum cascade laser is configured to generate first pumping light of a first frequency and second pumping light of a second frequency via intersubband light emission transition of electrons and to output a terahertz wave by using a difference frequency generation between the first pumping light and the second pumping light. As an example in which a terahertz wave is applied to optical measurement, Non-Patent Literature 1 (Frequency Stabilized GaP Continuous-Wave Terahertz Signal Generator for High-Resolution Spectroscopy, Optics and Photonics Journal, 2014, 4, 8-13) discloses a technique. In this technique disclosed in Non-Patent Literature 1, a measurement subject is irradiated with a terahertz wave which is generated by irradiating a wavelength conversion element with near infrared light, and the terahertz wave which has acted on the measurement subject is detected through synchronous wave-detection.

SUMMARY

Optical measurement using terahertz waves is expected to be applied for the purposes of quality control, analysis, and the like in various fields such as medical supplies, cosmetics, and foods. In the technique of Non-Patent Literature 1 in the related art, near infrared light is cut by a filter, and only a terahertz wave is used in measurement. However, in consideration of circumstances in which a small-sized terahertz wave light source as disclosed in Patent Literature 1 has been developed, an occasion in which a terahertz wave and coaxial light, such as mid-infrared light output coaxially with the terahertz wave, are utilized in measurement is also postulated.

When both a terahertz wave and coaxial light are used in measurement, it is assumed that the terahertz wave and the coaxial light such as mid-infrared light after having acted on a measurement subject are separately detected. However, as matters stand at present, there is no optical element which can accurately separate the optical axis of a terahertz wave and the optical axis of coaxial light such as mid-infrared light from each other. In addition, since detectors corresponding to frequency ranges are provided respectively, even if a light source is reduced in size, there is concern that the device in its entirety will be increased in size.

The present disclosure has been made to solve the foregoing problems, and an object thereof is to provide an optical measurement device and an optical measurement method, in which both a terahertz wave and coaxial light can be used in measurement and the device can be prevented from being increased in size.

According to an aspect of the present disclosure, there is provided an optical measurement device including a light source configured to output a terahertz wave and coaxial light having a wavelength different from the wavelength of the terahertz wave, coaxially with the terahertz wave; an intensity modulation unit configured to perform intensity modulation of at least the terahertz wave of the terahertz wave and the coaxial light in a predetermined modulation frequency; and a light detection unit configured to synchronously detects each of the terahertz wave and the coaxial light which have acted on a measurement subject via the intensity modulation unit based on the modulation frequency.

In this optical measurement device, a terahertz wave and coaxial light coaxially output from the light source are subjected to intensity modulation in a predetermined modulation frequency, and the terahertz wave and the coaxial light which have acted on a measurement subject are synchronously detected based on the modulation frequency. Accordingly, a single light detection unit can separately detect both a terahertz wave and coaxial light without separating the optical axis of the terahertz wave and the optical axis of the coaxial light from each other. Therefore, in this optical measurement device, both a terahertz wave and coaxial light can be used in measurement, and the device can be prevented from being increased in size.

In addition, the intensity modulation unit may have a switching portion configured to switch between a first attenuation region in which an intensity of the coaxial light is attenuated and a second attenuation region in which an intensity of the terahertz wave is attenuated with respect to optical axes of the terahertz wave and the coaxial light based on the modulation frequency. In this case, with a simple configuration, a terahertz wave and coaxial light can be alternately output from the intensity modulation unit in different phases. Therefore, the light detection unit can accurately perform synchronous wave-detection.

In addition, the optical measurement device may further include a light condensing lens configured to condense the terahertz wave and the coaxial light toward the intensity modulation unit. In this case, a terahertz wave and coaxial light output from the intensity modulation unit can approximate a rectangular wave. Accordingly, the light detection unit can separately detect a terahertz wave and coaxial light in a more reliable manner.

In addition, the optical measurement device may further include a reference signal generation unit configured to generate a first reference signal and a second reference signal of which phases are inverted with respect to each other, based on the modulation frequency. The light detection unit may have a first lock-in detection portion configured to perform lock-in detection of the terahertz wave based on the first reference signal and a second lock-in detection portion configured to perform lock-in detection of the coaxial light based on the second reference signal. Accordingly, the light detection unit can separately detect a terahertz wave and coaxial light all the more.

In addition, the light source may output the terahertz wave and the coaxial light in a repetition frequency higher than the modulation frequency. The light detection unit may have a prelock-in detection portion configured to perform lock-in detection of the terahertz wave and the coaxial light in a part preceding the first lock-in detection portion and the second lock-in detection portion based on the repetition frequency. When a terahertz wave and coaxial light output from the light source has a repetition frequency, the terahertz wave and the coaxial light after intensity modulation may have a sum frequency or a difference frequency of the modulation frequency and the repetition frequency. Under the condition that the repetition frequency is higher than the modulation frequency, lock-in detection based on the repetition frequency is performed in the preceding part, and lock-in detection based on the modulation frequency is performed thereafter, so that detection noise can be reduced.

In addition, the intensity modulation unit may include a total reflection prism configured to have an input surface for the terahertz wave and the coaxial light, an output surface, and a total reflection surface positioned in an optical path between the input surface and the output surface; and a terahertz wave absorber configured to be disposed to face the total reflection surface and be swept based on the modulation frequency within a range in which a distance d to the total reflection surface satisfies dm<d≤dt when a leaching length of an evanescent wave of the terahertz wave on the total reflection surface is dt and a leaching length of an evanescent wave of the coaxial light on the total reflection surface is dm. In this case, intensity modulation of a terahertz wave can be performed with a simple configuration by utilizing the difference between the leaching length of the evanescent wave of the terahertz wave and the leaching length of the evanescent wave of coaxial light.

In addition, the light source may output the terahertz wave and the coaxial light in a repetition frequency higher than the modulation frequency. The optical measurement device may further include a reference signal generation unit configured to generate a reference signal based on the modulation frequency. The light detection unit may have a first lock-in detection portion configured to perform lock-in detection of the terahertz wave based on the reference signal and a second lock-in detection portion configured to perform lock-in detection of the coaxial light based on the repetition frequency. Accordingly, the light detection unit can separately detect a terahertz wave and coaxial light all the more.

In addition, the coaxial light may be mid-infrared light. Such a light source is realized by a small-sized light source such as a quantum cascade laser. Therefore, the device can be sufficiently reduced in size in its entirety.

In addition, according to another aspect of the present disclosure, there is provided an optical measurement method including, outputting a terahertz wave and coaxial light having a wavelength different from the wavelength of the terahertz wave, coaxially with the terahertz wave; performing intensity modulation of at least the terahertz wave in a predetermined modulation frequency; and synchronously detecting each of the terahertz wave and the coaxial light which have acted on a measurement subject via the intensity modulation based on the modulation frequency.

In this optical measurement method, a terahertz wave and coaxial light coaxially output from the light source are subjected to intensity modulation in a predetermined modulation frequency, and the terahertz wave and the coaxial light which have acted on a measurement subject are synchronously detected based on the modulation frequency. Accordingly, a single light detection unit can separately detect both a terahertz wave and coaxial light without separating the optical axis of the terahertz wave and the optical axis of the coaxial light from each other. Therefore, in this optical measurement method, both a terahertz wave and coaxial light can be used in measurement, and the device can be prevented from being increased in size.

As described above, according to the optical measurement device and the optical measurement method, both a terahertz wave and coaxial light can be used in measurement, and the device can be prevented from being increased in size.

BRIEF DESCRIPTION OF THE DRAWINGS

FIG. 4 is a view illustrating an example of a first reference signal and a second reference signal.

FIG. 9 is a view illustrating Example of a window material forming a first attenuation region.

FIG. 10 is a view illustrating Example of a window material forming a second attenuation region.

FIG. 11 is a view illustrating Example of transmission peak intensity of coaxial light I in second attenuation region/transmission peak intensity of terahertz wave T in first attenuation region.

FIG. 12 is a view illustrating a modification example of the first reference signal and the second reference signal.

DETAILED DESCRIPTION

Hereinafter, with reference to the drawings, a preferable embodiment of an optical measurement device and an optical measurement method according to an aspect of the present disclosure will be described in detail.
[Configuration of Optical Measurement Device]

Figure 1:
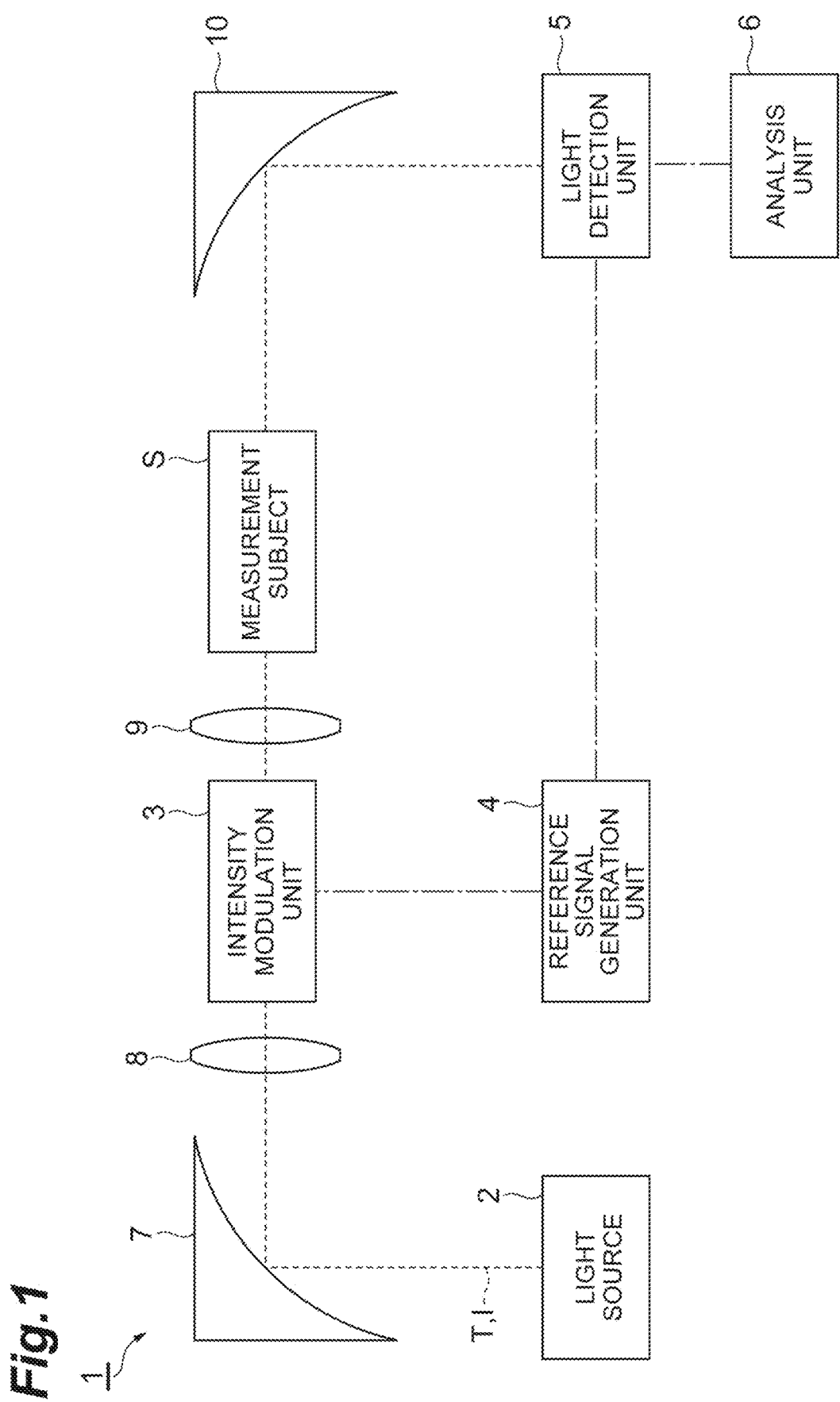
FIG. 1 is a schematic view illustrating an embodiment of an optical measurement device.

FIG. 1 a schematic view of a configuration illustrating an embodiment of an optical measurement device. For example, this optical measurement device 1 is a device performing optical measurement using both a terahertz wave and mid-infrared light and is constituted as a device performing quality control or analysis at manufacturing sites in various fields including medical supplies, cosmetics, and foods. As illustrated in FIG. 1, the optical measurement device 1 is configured to include a light source 2, an intensity modulation unit 3, a reference signal generation unit 4, a light detection unit 5, and an analysis unit 6.

The light source 2 is a device outputting a terahertz wave T and coaxial light I having a wavelength different from that of the terahertz wave T, coaxially with the terahertz wave T. For example, the light source 2 is constituted of a quantum cascade laser (DFG-QCL) having a distributed feedback structure. For example, the DFG-QCL generates the terahertz wave T due to a difference frequency generation of mid-infrared light oscillating with two wavelengths and outputs mid-infrared light as the coaxial light I. The terahertz wave T and the coaxial light I output from the light source 2 are collimated by a parabolic mirror 7 and then are incident on the intensity modulation unit 3 in a state of being condensed by a light condensing lens 8.

As an example, the element size of the light source 2 is 14 μm×3.0 mm, and the package size is approximately 50 mm×30 mm×20 mm. In addition, the wavelength region of the terahertz wave T is within a range of approximately 100 μm to 1 mm, for example, and the wavelength region of the coaxial light I is within a range of approximately 2.5 μm to 25 μm, for example. The intensity of the coaxial light I is higher than the intensity of the terahertz wave T, and the intensity ratio between the coaxial light I and the terahertz wave T is approximately $10^4$. A repetition frequency f0 of the terahertz wave T and the coaxial light I is within a range of approximately several hundred kHz to several MHz, for example.

Figure 2:
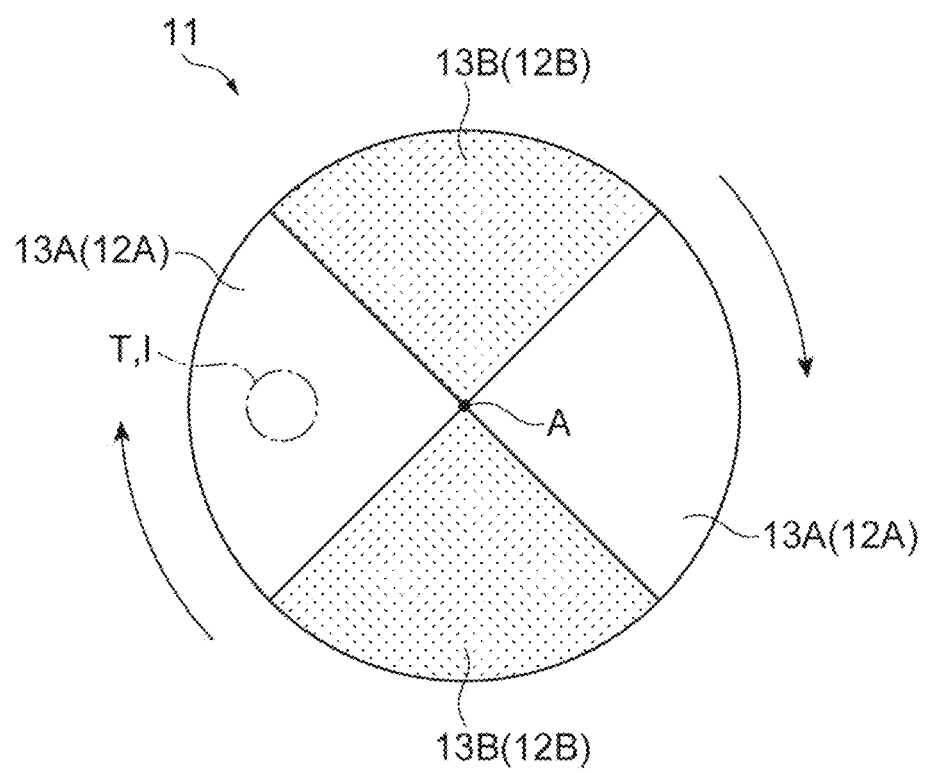
FIG. 2 is a schematic view illustrating an example of a configuration of an intensity modulation unit.

The intensity modulation unit 3 is a part performing intensity modulation of at least the terahertz wave T of the terahertz wave T and the coaxial light I in a predetermined modulation frequency f1 In the present embodiment, the intensity modulation unit 3 performs intensity modulation of both the terahertz wave T and the coaxial light I. Specifically, the intensity modulation unit 3 is configured to perform intensity modulation using a rotary wheel method and includes a disk-shaped switching portion 11, as illustrated in FIG. 2. In the example of FIG. 2, the switching portion 11 has four regions divided around a central axis A. These four regions are constituted of first attenuation regions 12A and second attenuation regions 12B which are alternately disposed around the central axis A.

The first attenuation regions 12A are regions in which the intensity of the coaxial light I is attenuated. A window material 13A constituting the first attenuation region 12A has attenuating properties with respect to the coaxial light I and is formed of a material having transparency with respect to the terahertz wave T. When the coaxial light I is midinfrared light, examples of a material of the window material 13A include Z-cut quartz, a cycloolefin polymer (for example, a cycloolefin copolymer), polymethylpentene, and sapphire.

The second attenuation regions 12B are regions in which the intensity of the terahertz wave T is attenuated. A window material 13B constituting the second attenuation regions 12B has attenuating properties with respect to the terahertz wave T and is formed of a material having transparency with respect to the coaxial light I. When the intensity of the terahertz wave T output from the light source 2 is sufficiently (by approximately four orders of magnitude) smaller than that of the coaxial light I, the window material 13B may have attenuating properties with respect to both the terahertz wave T and the coaxial light I. That is, the intensity of the terahertz wave T after attenuation need only be at a negligible level with respect to the intensity of the coaxial light I after attenuation. Examples of a material of the window material 13B include ZnSe, KBr, ZnS, Si, polyethylene, diamond, and Ge.

Figure 3A:
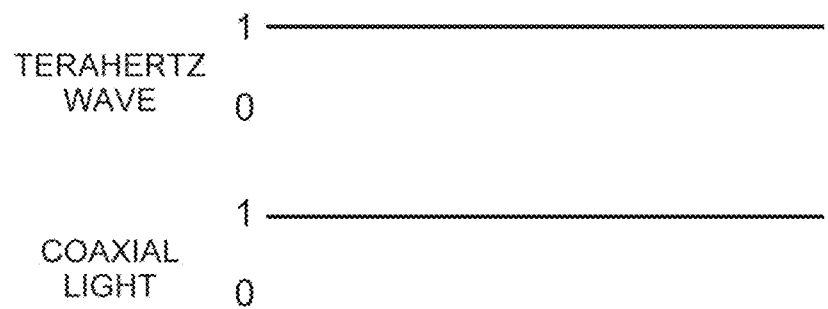
FIG. 3A is a view illustrating intensities of a terahertz wave and coaxial light before intensity modulation.
Figure 3B:
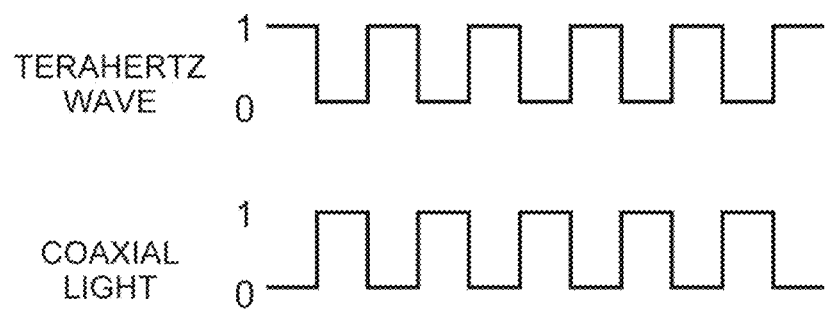
FIG. 3B is a view illustrating intensities of a terahertz wave and coaxial light after intensity modulation.

The central axis A of the switching portion 11 is disposed at a position deviated from the optical axes of the terahertz wave T and the coaxial light I. The switching portion 11 is rotated around the central axis A by a driving unit (not illustrated), such that the switching portion 11 switches between the first attenuation regions 12A and the second attenuation regions 12B in the modulation frequency f1 with respect to the optical axes of the terahertz wave T and the coaxial light I. Therefore, as illustrated in FIGS. 3A and 3B, the terahertz wave T and the coaxial light I passing through the switching portion 11 are subjected to intensity modulation based on the modulation frequency f1, and the terahertz wave T and the coaxial light I are alternately output from the switching portion 11 in a rectangular wave shape in a state in which their phases are deviated by 180°. The terahertz wave T and the coaxial light I output from the switching portion 11 are collimated by a collimating lens 9. Thereafter, they act on a measurement subject S and are incident on the light detection unit 5 via a parabolic mirror 10. The modulation frequency f1 is 1 kHz, for example.

In the example of FIG. 2, four regions are provided in the switching portion 11. However, the switching portion 11 may have a different number of separate regions, such as two regions, six regions, and eight regions. In addition, the switching portion 11 is not limited to the rotary wheel type as in the example of FIG. 2 and may be a shutter type in which the first attenuation regions 12A and the second attenuation regions 12B alternately move forward and rearward with respect to the optical axes of the terahertz wave T and the coaxial light I.

The reference signal generation unit 4 is a signal generator generating a reference signal based on a modulation frequency. The reference signal generation unit 4 generates the modulation frequency f1 to be used in the intensity modulation unit 3 and outputs the modulation frequency f1 to the driving unit of the intensity modulation unit 3. In addition, as illustrated in FIG. 4, the reference signal generation unit 4 generates a reference signal (first reference signal) R1 for a terahertz wave and a reference signal (second reference signal) R2 for coaxial light of which phases are inverted with respect to each other in a rectangular wave shape, based on the modulation frequency f1. The reference signal generation unit 4 outputs the reference signal R1 for a terahertz wave and the reference signal R2 for coaxial light, which have been generated, to the light detection unit 5. As illustrated in FIG. 1, the reference signal generation unit 4 may be an independent constituent element or may be a constituent element embedded in the light source 2 or the light detection unit 5.

Figure 5:
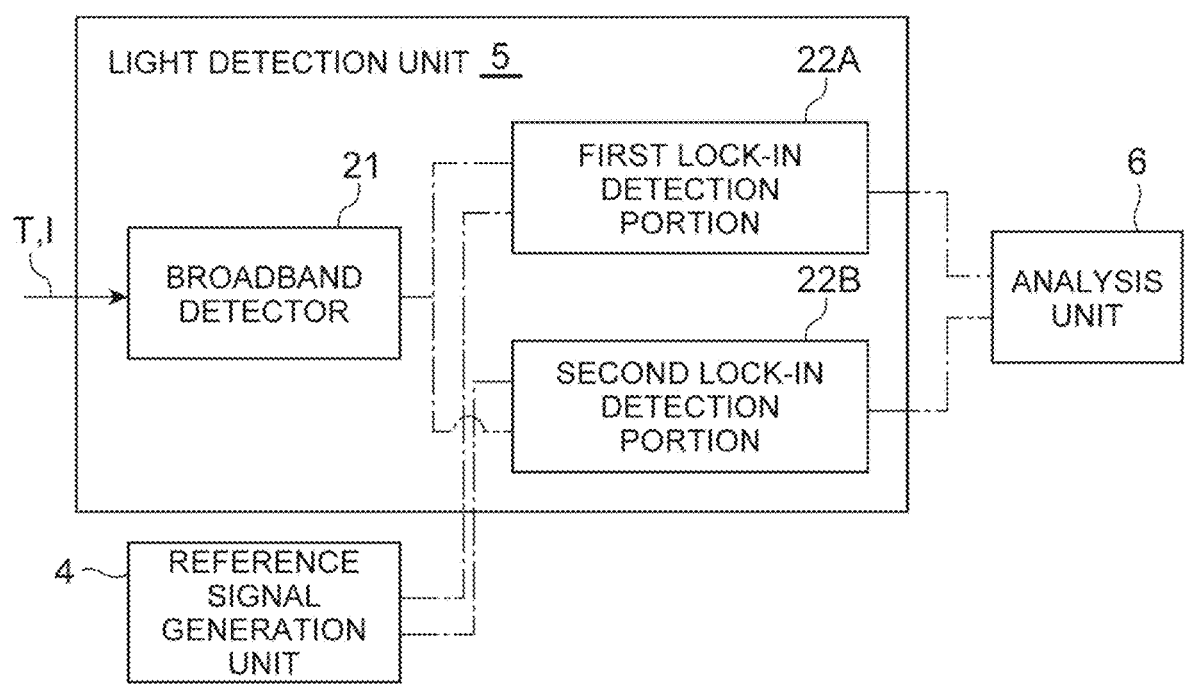
FIG. 5 is a block diagram illustrating an example of a configuration of a light detection unit.

The light detection unit 5 is a part synchronously detecting each of the terahertz wave T and the coaxial light I, which have acted on the measurement subject S, via the intensity modulation unit 3 based on the modulation frequency f1. FIG. 5 is a view illustrating an example of a configuration of a light detection unit. As illustrated in FIG. 5, the light detection unit 5 is constituted of a broadband detector 21, a first lock-in detection portion 22A, and a second lock-in detection portion 22B.

The broadband detector 21 is a broadband light detector which can detect both the terahertz wave T and the coaxial light I. Examples of the broadband detector 21 include a thermocouple, a pyroelectric sensor, a bolometer, and a Golay cell. The broadband detector 21 detects the terahertz wave T and the coaxial light I from the measurement subject S and outputs a signal based on the detection result to each of the first lock-in detection portion 22A and the second lock-in detection portion 22B.

The first lock-in detection portion 22A is a part performing lock-in detection of the terahertz wave T based on the reference signal R1 for a terahertz wave. In addition, the second lock-in detection portion 22B is a part performing lock-in detection of the coaxial light I based on the reference signal R2 for coaxial light. The first lock-in detection portion 22A and the second lock-in detection portion 22B may function when a program is executed by a CPU in a computer system or may be constituted of a field-programmable gate array (FPGA) or the like.

The reference signal R1 for a terahertz wave from the reference signal generation unit 4 is input to the first lock-in detection portion 22A, and the reference signal R2 for coaxial light is input to the second lock-in detection portion 22B. The first lock-in detection portion 22A performs lock-in detection of signals input from the broadband detector 21, based on the reference signal R1 for a terahertz wave, and detects only a signal, of the signals, corresponding to the terahertz wave T. In addition, the second lock-in detection portion 22B performs lock-in detection of signals input from the broadband detector 21, based on the reference signal R2 for coaxial light, and detects only a signal, of the signals, corresponding to the coaxial light I. Each of the first lock-in detection portion 22A and the second lock-in detection portion 22B outputs a signal indicating the detection result to the analysis unit 6.

The analysis unit 6 is a part analyzing the terahertz wave T and the coaxial light I which have acted on the measurement subject S. For example, the analysis unit 6 is physically configured to include a memory such as a RAM and a ROM, a processor such as a CPU, a communication interface, and a storage unit such as a hard disk. Examples of the computer include a personal computer, a microcomputer, a cloud server, and a smart device (a smartphone, a tablet terminal, and the like). A display device such as a monitor, and input devices such as a keyboard, a mouse, and a touch panel may be connected to the analysis unit 6. Similar to the first lock-in detection portion 22A and the second lock-in detection portion 22B, the analysis unit 6 may be constituted of an FPGA or the like.

Figure 6:
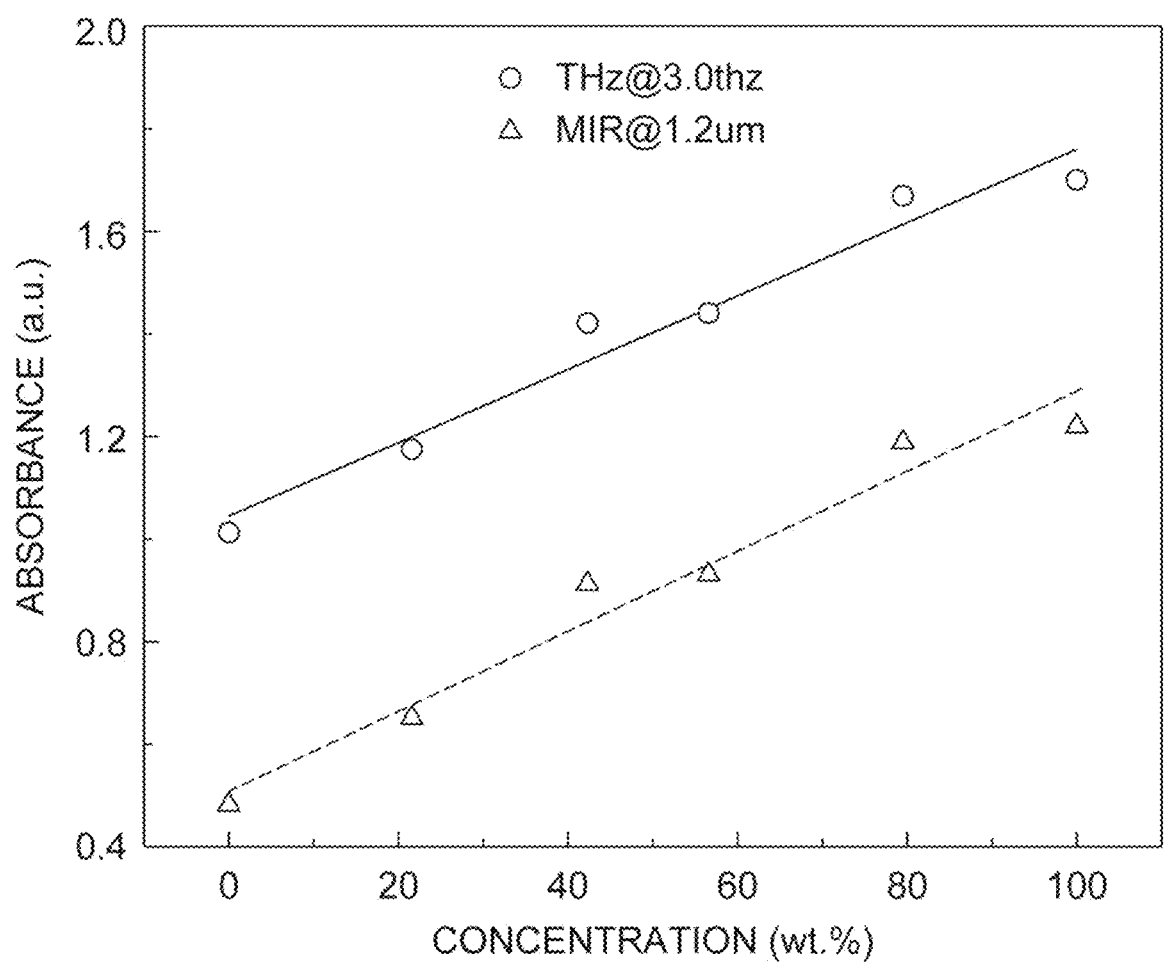
FIG. 6 is a view illustrating an example of an analysis result obtained by an analysis unit.
Figure 7:
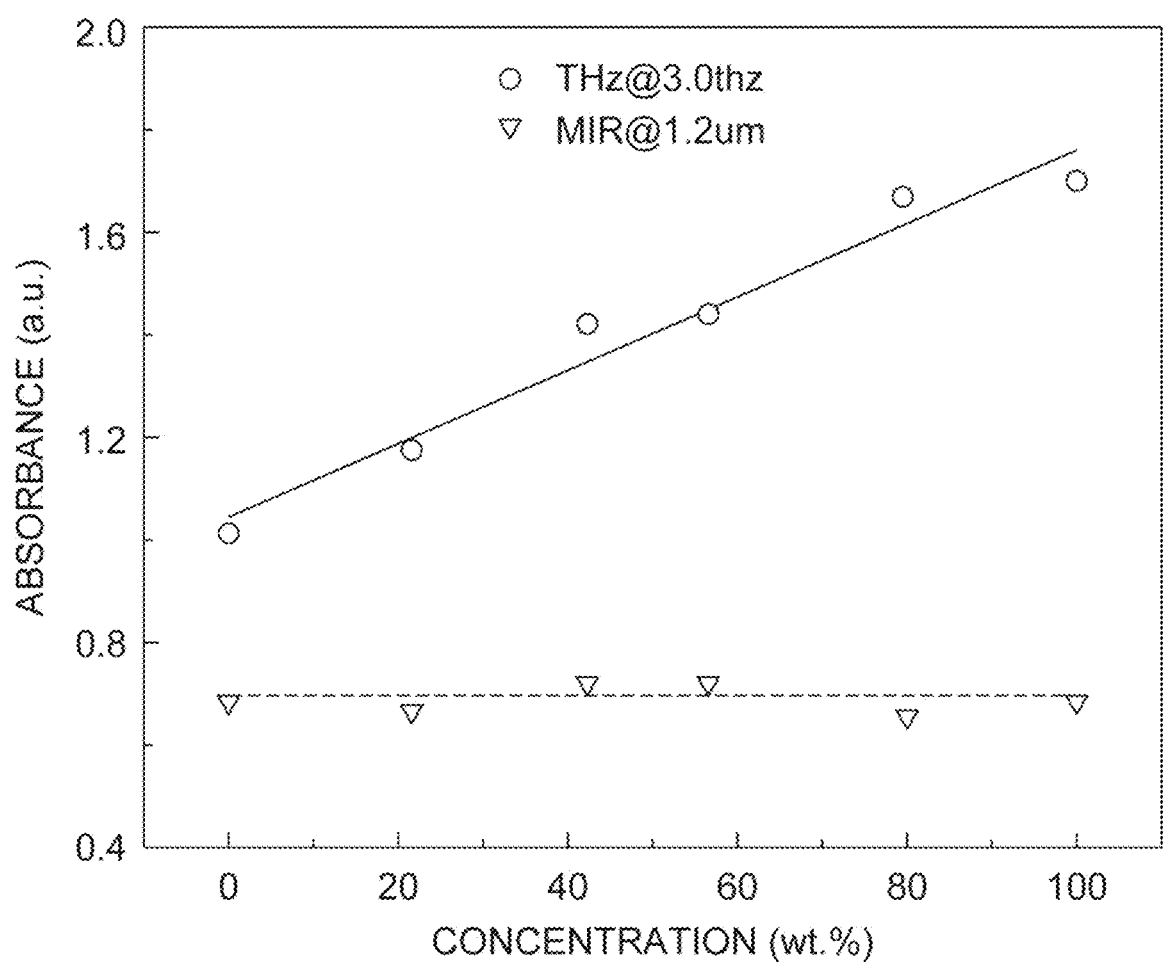
FIG. 7 is a view illustrating another example of an analysis result obtained by the analysis unit.

FIG. 6 is a view illustrating an example of an analysis result obtained by an analysis unit. In addition, FIG. 7 is a view illustrating another example of an analysis result obtained by the analysis unit. FIGS. 6 and 7 illustrate results having a mixed sample of a medical product and an additive, of which the crystal form changes due to moisture, as the measurement subject S, and the absorbance of the terahertz wave T and the coaxial light I in the measurement subject S is measured. In FIGS. 6 and 7, the horizontal axis indicates the concentration of the medical product, and the vertical axis indicates the absorbance.

In the result of FIG. 6, it is ascertained that both the absorbance of the terahertz wave T and the absorbance of the coaxial light I have increased in proportion to the concentration of the medical product. In the case of FIG. 6, it is presumed that there is a possibility of crystal transition which has occurred due to moisture in the mixed sample, or a possibility of an increased additive B. In addition, in the result of FIG. 7, the absorbance of the terahertz wave T has increased in proportion to the concentration of the medical product. On the other hand, there is little change in the absorbance of the coaxial light I. A terahertz wave is highly sensitive to crystal transition, and mid-infrared light is less sensitive to crystal transition. Therefore, in the case of FIG. 7, it is presumed that there is a possibility of crystal transition which has occurred due to moisture in the mixed sample. In the results of FIGS. 6 and 7, the absorbance obtained from signals input to the analysis unit 6 is plotted as it stands. However, analysis may be performed by applying subtraction processing or dividing processing to the detection result of the terahertz wave T and the detection result of the coaxial light I.

[Operation of Optical Measurement Device]

Figure 8:
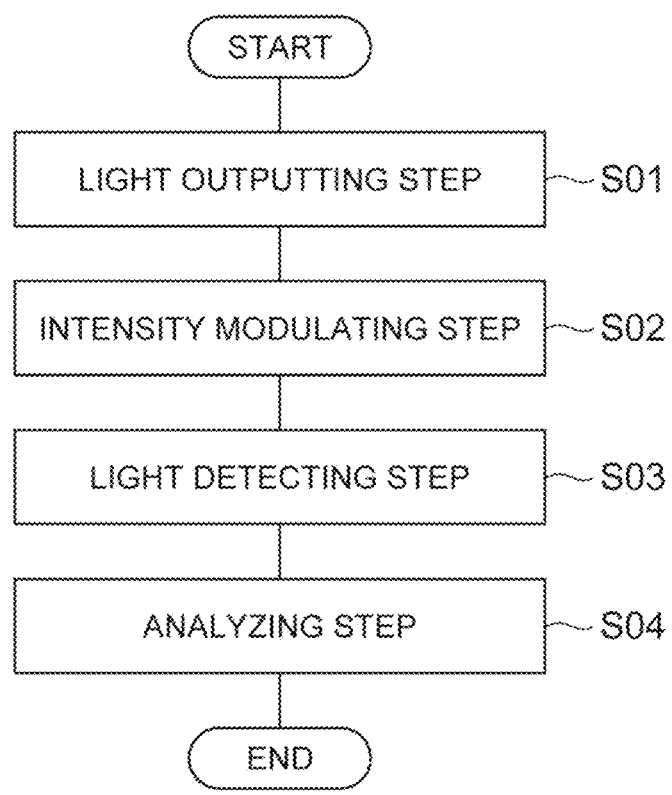
FIG. 8 is a flowchart illustrating an example of all operation of the optical measurement device.

Next, an operation of the optical measurement device described above will be described. FIG. 8 is a flowchart illustrating an example of an operation of the optical measurement device.

As illustrated in FIG. 8, in the optical measurement device 1, first, the terahertz wave T and the coaxial light I are output from the light source 2 (Step S01: light outputting step). The terahertz wave T and the coaxial light I output from the light source 2 are condensed by the light condensing lens 8 via the parabolic mirror 7 and are input to the intensity modulation unit 3. In the intensity modulation unit 3, at least the terahertz wave T is subjected to intensity modulation in the modulation frequency f1 generated by the reference signal generation unit 4 (Step S02: intensity modulating step). The terahertz wave T and the coaxial light I are alternately output from the intensity modulation unit 3 in the modulation frequency f1 in a state in which their phases are deviated by 180°. The terahertz wave T and the coaxial light I output from the intensity modulation unit 3 are collimated by the collimating lens 9. Thereafter, they act on the measurement subject S and are input to the light detection unit 5 via the parabolic mirror 10.

The light detection unit 5 synchronously detects the terahertz wave T and the coaxial light I which have acted on the measurement subject S via the intensity modulation unit 3, based on the modulation frequency f1 (Step S03: light detecting step). In the light detection unit 5, the terahertz wave T and the coaxial light I are detected by the broadband detector 21, and a signal based on the detection result is output to the first lock-in detection portion 22A and the second lock-in detection portion 22B. In the first lock-in detection portion 22A, lock-in detection of the terahertz wave T is performed with reference to the reference signal R1 for a terahertz wave based on the modulation frequency f1. In addition, in the second lock-in detection portion 22B of the light detection unit 5, lock-in detection of the coaxial light I is performed with reference to the reference signal R2 for coaxial light based on the modulation frequency f1. Thereafter, signals from the first lock-in detection portion 22A and the second lock-in detection portion 22B are output to the analysis unit 6, and analysis of the measurement result is executed (Step S04: analyzing step).

Operational Effects

As described above, in the optical measurement device 1, the terahertz wave T and the coaxial light I coaxially output from the light source 2 are subjected to intensity modulation in the modulation frequency f1, and the terahertz wave T and the coaxial light I which have acted on the measurement subject S based on the modulation frequency f1 are synchronously detected. Accordingly, a single light detection unit (here, the broadband detector 21) can separately detect both the terahertz wave T and the coaxial light I without separating the optical axis of the terahertz wave T and the optical axis of the coaxial light I from each other by using an optical element or the like. Therefore, in the optical measurement device 1, both the terahertz wave T and the coaxial light I can be used in measurement, and the device can be prevented from being increased in size.

In addition, in the optical measurement device 1, the intensity modulation unit 3 is constituted of the switching portion 11. The switching portion 11 switches between the first attenuation regions 12A in which the intensity of the coaxial light I is attenuated and the second attenuation regions 12B in which the intensity of the terahertz wave T is attenuated with respect to the optical axes of the terahertz wave T and the coaxial light I based on the modulation frequency f1. By means of this switching portion 11, with a simple configuration, the terahertz wave T and the coaxial light I can be alternately output from the intensity modulation unit 3 in different phases. Therefore, the light detection unit 5 can accurately perform synchronous wave-detection.

In addition, the optical measurement device 1 may have the light condensing lens 8 condensing the terahertz wave T and the coaxial light I toward the intensity modulation unit 3. Due to the light condensing lens 8 condensing light input to the intensity modulation unit 3, the terahertz wave T and the coaxial light I output from the intensity modulation unit 3 can approximate a rectangular wave. Accordingly, in light output from the intensity modulation unit 3, a temporal overlap between the terahertz wave T and the coaxial light I can be restrained. In addition, the waveforms of the terahertz wave T and the coaxial light I can approximate the waveform of the reference signal. Therefore, the light detection unit 5 can separately detect the terahertz wave T and the coaxial light I in a more reliable manner.

Disposition of the light condensing lens 8 and the collimating lens 9 may be omitted. When light is not condensed by the light condensing lens 8, the terahertz wave T and the coaxial light I output from the intensity modulation unit 3 have a sine wave shape depending on the beam diameters of the terahertz wave T and the coaxial light I. However, for example, when a temporal overlap between the terahertz wave T and the coaxial light I is sufficiently small, or when the influence of a temporal overlap between the terahertz wave T and the coaxial light I can be eliminated by adjusting the duty ratio of the reference signal or the like, disposition of the light condensing lens 8 and the collimating lens 9 may be omitted.

In addition, the reference signal generation unit 4 generating the reference signal R1 for a terahertz wave and the reference signal R2 for coaxial light, of which phases are inverted with respect to each other, based on the modulation frequency f1 is provided in the optical measurement device 1. In addition, the first lock-in detection portion 22A performing lock-in detection of the terahertz wave T based on the reference signal R1 for a terahertz wave, and the second lock-in detection portion 22B performing lock-in detection of the coaxial light I based on the reference signal R2 for coaxial light are provided in the light detection unit 5. Due to such a configuration, the light detection unit 5 can separately detect a terahertz wave and coaxial light all the more.

In addition, in the optical measurement device 1, the coaxial light I output from the light source 2 together with the terahertz wave T is mid-infrared light. Such a light source 2 is realized by a small-sized light source such as a quantum cascade laser. Therefore, the optical measurement device 1 can be sufficiently reduced in size in its entirety.

[Example of Window Material of Switching Portion]

Subsequently, Examples of the window material 13A constituting the first attenuation regions 12A and the window material 13B constituting the second attenuation regions 12B in the switching portion 11 described above will be described.

FIG. 9 is a view illustrating Example of a window material forming a first attenuation region. In FIG. 9, when the peak intensity ratio between the terahertz wave T and the coaxial light I was 1:10000, the attenuation amounts of the terahertz wave T and the coaxial light I in regard to the material of the window material 13A were measured. As illustrated in FIG. 9, when one piece of Z-cut quartz having a thickness of 1 mm was used, the peak intensity of the terahertz wave T transmitted through the window material 13A was 0.73 mW. In addition, when one piece of a cycloolefin polymer having a thickness of 2 mm was used, the peak intensity of the terahertz wave T transmitted through the window material 13A was 0.8 mW. In both of the cases, the peak intensity of the coaxial light I was 0 mW, and it could be checked that these materials could be utilized as the window material 13A.

In addition, FIG. 10 is a view illustrating Example of a window material forming a second attenuation region. In FIG. 10, similar to the case of FIG. 9, when the peak intensity ratio of the terahertz wave T and the coaxial light I was 1:10000, the attenuation amounts of the terahertz wave T and the coaxial light I in regard to the material of the window material 13B were measured. The attenuation rate could be adjusted by adjusting the number of materials or adjusting the thickness. In this case, it was performed by adjusting the number of materials. The followings are two examples of selecting conditions of the window material 13B. The conditions of (1) are conditions for limiting light which has been transmitted through the window material 13B and has acted on the measurement subject S to only the influence of the coaxial light I. The conditions indicate that the intensity of the terahertz wave T is sufficiently smaller than the intensity of the coaxial light I. In addition, the conditions of (2) are conditions for fixing the amplification factor, resolution power, and the dynamic range in the light detection unit 5, when the terahertz wave T and the coaxial light I are measured at the same time. The conditions indicate that the peak intensity of the terahertz wave T from the window material 13A and the peak intensity of the coaxial light I from the window material 13B, which are alternately output, become approximately the same as each other. Since the threshold values vary depending on the kinds of detectors, the following values are merely examples.

(1) Transmission peak intensity of terahertz wave T/Transmission peak intensity of coaxial light I≤$10^{-3}$ (2) Transmission peak intensity of coaxial light I in window material 13B/Transmission peak intensity of terahertz wave T in window material 13A≤$10^2$ As illustrated in FIG. 10, when seven pieces of highly-resistive float zone silicon (HRFZ-Si) having a thickness of 1 mm were used, the value of transmission peak intensity of terahertz wave T/transmission peak intensity of coaxial light I was 0.000157. In addition, when 25 pieces of diamond having a thickness of 1.2 mm were used, the value of transmission peak intensity of terahertz wave T/transmission peak intensity of coaxial light I was 0.0001. When 12 pieces of ZnSe having a thickness of 1 mm were used, the value of transmission peak intensity of terahertz wave T/transmission peak intensity of coaxial light I was 2.76 $E^{-9}$. In all of the cases, it could be checked that the conditions of (1) were satisfied.

In addition, as illustrated in FIG. 11, when the material of the window material 13A was Z-cut quartz, the value of transmission peak intensity of coaxial light I/transmission peak intensity of terahertz wave T was approximately 51 with the highly-resistive float zone silicon, was approximately 96 with the diamond, and was approximately 78 with the ZnSe. Therefore, in all of the cases, it could be checked that the conditions of (2) were satisfied.

Modification Example

The present disclosure is not limited to the foregoing embodiment. In the switching portion 11 illustrated in FIG. 2, the terahertz wave T and the coaxial light I simultaneously pass through both the first attenuation regions 12A and the second attenuation regions 12B in boundary parts between the first attenuation regions 12A and the second attenuation regions 12B. When the terahertz wave T and the coaxial light I have a large beam diameter to a certain extent, signals of both thereof in the light detection unit 5 may be insufficiently separated due to the influence of the terahertz wave T and the coaxial light I partially overlapping each other after intensity modulation. In this case, for example, as illustrated in FIG. 12, the terahertz wave T and the coaxial light I can be separately detected in a sufficient manner by reducing the duty ratio of one of the reference signal R1 for a terahertz wave and the reference signal R2 for coaxial light.

Figure 13:
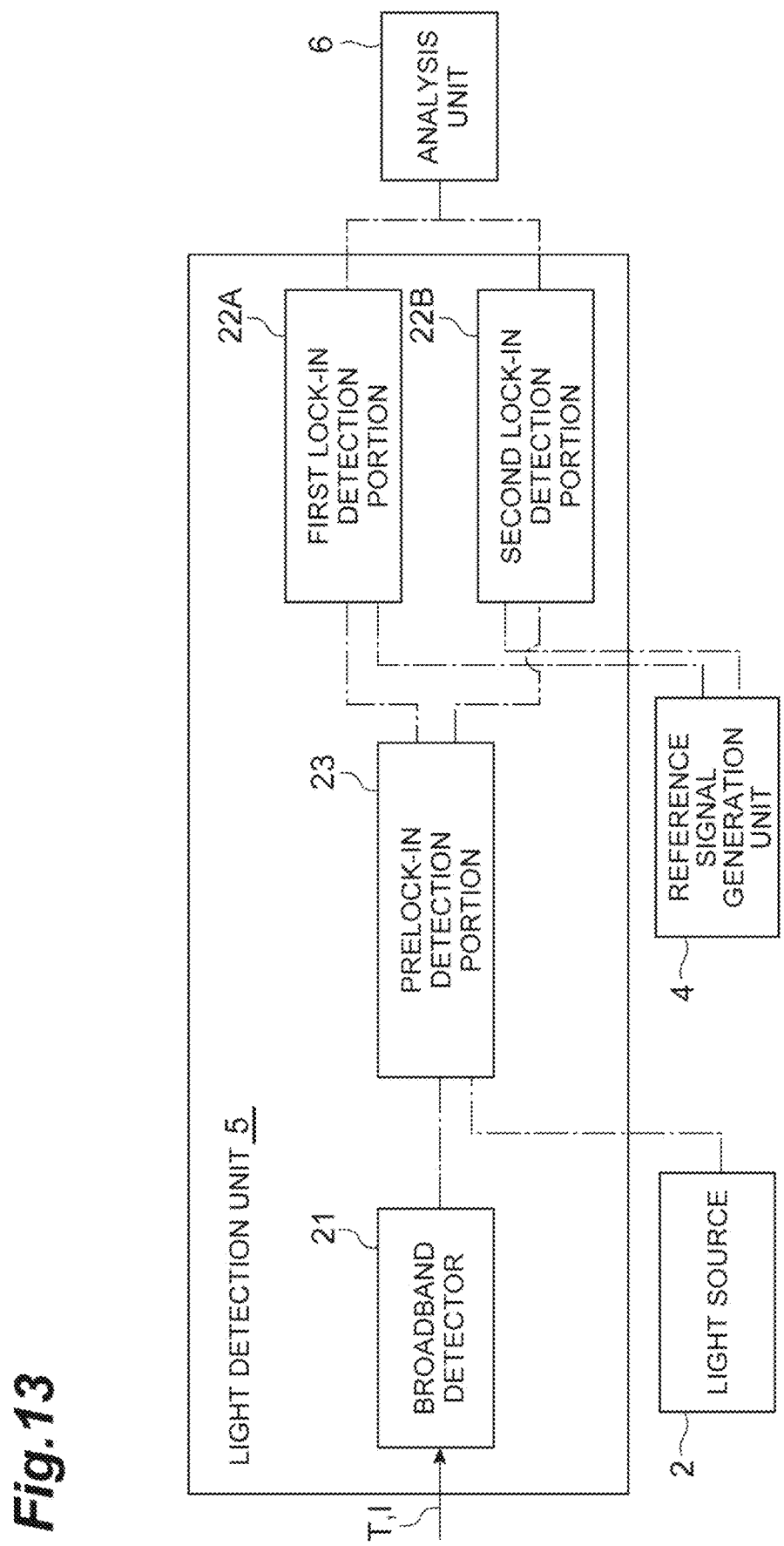
FIG. 13 is a block diagram illustrating a modification example of the light detection unit.

In addition, FIG. 13 is a block diagram illustrating a modification example of the light detection unit. The form illustrated in FIG. 13 differs from the form illustrated in FIG. 1 in that the light detection unit 5 performs dual lock-in detection. In this example of FIG. 13, the light detection unit 5 further includes a prelock-in detection portion 23.

The prelock-in detection portion 23 is disposed on a preceding part side of the first lock-in detection portion 22A and the second lock-in detection portion 22B. For example, the prelock-in detection portion 23 receives a signal based on the repetition frequency f0 of the terahertz wave T and the coaxial light I from the light source 2 and generates a reference signal based on the repetition frequency f0. The prelock-in detection portion 23 performs lock-in detection of a signal output from the broadband detector 21 based on the reference signal and outputs a signal based on the detection result to each of the first lock-in detection portion 22A and the second lock-in detection portion 22B.

When the terahertz wave T and the coaxial light I output from the light source 2 have the repetition frequency f0, the terahertz wave T and the coaxial light I after intensity modulation performed by the intensity modulation unit 3 may be a sum frequency or a difference in frequency of the modulation frequency f1 and the repetition frequency f0. Under the condition that the repetition frequency f0 is higher than the modulation frequency f1, lock-in detection based on the repetition frequency f0 is performed in the preceding part, and lock-in detection based on the modulation frequency f1 is performed thereafter, so that detection noise can be reduced. The signal based on the repetition frequency f0 may be generated by the light source 2. However, the signal may be generated by the reference signal generation unit 4 or may be generated by the light detection unit 5 as illustrated in FIG. 1.

Figure 14:
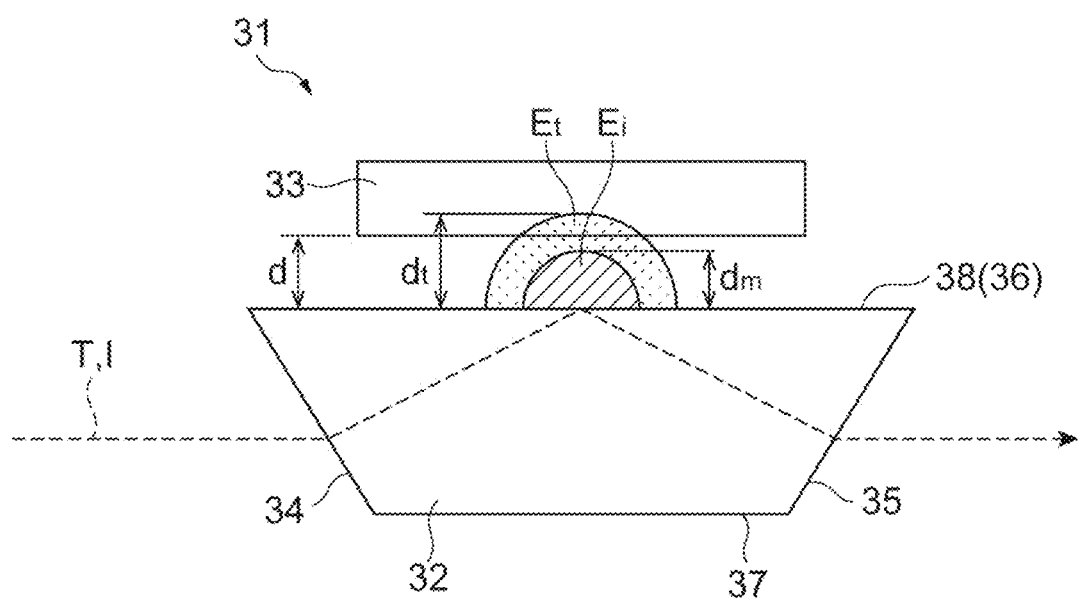
FIG. 14 is a schematic view illustrating a modification example of the intensity modulation unit.

In addition, FIG. 14 is a schematic view illustrating a modification example of the intensity modulation unit. In the example of FIG. 14, an intensity modulation unit 31 is configured to include a total reflection prism 32 and a terahertz wave absorber 33. For example, the total reflection prism 32 is famed of a material, such as Si, polyethylene, germanium, and diamond, having transmitting properties with respect to both the terahertz wave T and the coaxial light I. For example, the total reflection prism 32 has an isosceles trapezoid shape in a side view. One surface corresponding to a side of the trapezoid serves as an input surface 34 for the terahertz wave T and the coaxial light I, and the other side serves as an output surface 35 for the terahertz wave T and the coaxial light I.

In addition, the area of an upper surface 36 of the total reflection prism 32 is larger than the area of a bottom surface 37. This upper surface 36 is positioned in an optical path for the terahertz wave T and the coaxial light I inside the total reflection prism 32 between the input surface 34 and the output surface 35 and serves as a total reflection surface 38 on which the terahertz wave T and the coaxial light I are totally reflected. The terahertz wave T and the coaxial light I incident on the inside of the total reflection prism 32 from the input surface 34 are refracted on the input surface 34, travel toward the total reflection surface 38, and are totally reflected on the total reflection surface 38. The terahertz wave T and the coaxial light totally reflected on the total reflection surface 38 are refracted on the output surface 35 and are emitted from the output surface 35 coaxially with the terahertz wave T and the coaxial light I which are incident on the input surface 34.

The terahertz wave absorber 33 is an object having absorbing properties with respect to the terahertz wave T. For example, the terahertz wave absorber 33 is constituted of a low resistance semiconductor including silicon, a metamaterial absorber, or a plate-shaped porous medium including water. The terahertz wave absorber 33 is disposed to face the total reflection surface 38 of the total reflection prism 32 with a certain distance therebetween. For example, the terahertz wave absorber 33 can be moved forward and rearward with respect to the total reflection surface 38 by a driving unit such as a piezoelectric element.

In the total reflection surface 38, due to total reflection of the terahertz wave T and the coaxial light I, an evanescent wave of each thereof is generated. Since the wavelength of the terahertz wave T and the wavelength of the coaxial light I are different from each other, the leaching length of an evanescent wave Et of the terahertz wave T and the leaching length of an evanescent wave Ei of the coaxial light I on the total reflection surface 38 have values different from each other. In the present embodiment, the wavelength region of the terahertz wave T is within a range of approximately 100 μm to 1 mm, for example. On the other hand, the wavelength region of the coaxial light I is within a range of approximately 2.5 μm to 25 μm, for example. That is, the wavelength region of the coaxial light I is smaller than the wavelength region of the terahertz wave T by one digit or more, and the leaching length of the evanescent wave Et of the terahertz wave T is larger than the leaching length of the evanescent wave Ei of the coaxial light I.

When the leaching length of the evanescent wave Et of the terahertz wave T on the total reflection surface 38 is dt and the leaching length of the evanescent wave Ei of the coaxial light I is dm, the terahertz wave absorber 33 is swept by a driving unit within a range in which a distance d to the total reflection surface 38 satisfies dm<d≤dt. In addition, the sweeping cycle of the terahertz wave absorber 33 is based on the modulation frequency f1.

In the intensity modulation unit 31 having such a configuration, intensity modulation of the coaxial light I is not performed, and intensity modulation is performed with respect to only the terahertz wave T based on the modulation frequency f1. In this case, in the light detection unit 5, the first lock-in detection portion 22A need only perform lock-in detection of the terahertz wave T by using the reference signal R1 for a terahertz wave based on the modulation frequency f1, and the second lock-in detection portion 22B need only perform lock-in detection of the coaxial light I by using the reference signal R2 for coaxial light based on the repetition frequency f0 of the coaxial light I.

In this intensity modulation unit 31, with a simple configuration, intensity modulation can be performed with respect to the terahertz wave T by utilizing the difference between the leaching length of the evanescent wave Et of the terahertz wave T and the leaching length of the evanescent wave Ei of the coaxial light I. In addition, in the light detection unit 5, the terahertz wave T and the coaxial light I can be separately detected in a sufficient manner. In regard to the coaxial light I which is not subjected to intensity modulation using the intensity modulation unit 31, although the composition of the terahertz wave T is also maintained, when the intensity ratio between the coaxial light I and the terahertz wave T is approximately $10^4$ as in the present embodiment, the terahertz wave T included in the coaxial light I can be disregarded. In addition, when the form of FIG.

14 is employed, the reference signal R1 for a terahertz wave used by the first lock-in detection portion 22A may be a sum frequency or a difference frequency of the modulation frequency f1 and the repetition frequency f0. In addition, dual lock-in detection as illustrated in FIG. 13 may be performed.

Furthermore, optical guiding of the terahertz wave T and the coaxial light I from the light source 2 is not limited to the parabolic mirrors 7 and 10 illustrated in FIG. 1 and may be realized by a hyper-hemispherical lens or the like which is directly fixed to the light source 2, the broadband detector 21, or the like. In addition, in the example of FIG. 1, the terahertz wave T and the coaxial light I subjected to intensity modulation is transmitted through the measurement subject S. However, the terahertz wave T and the coaxial light I subjected to intensity modulation may be reflected by the measurement subject S. The measurement subject S may be placed on the total reflection surface of a prism or the like, such that an evanescent wave of each of the terahertz wave T and the coaxial light I generated on the total reflection surface acts on the measurement subject S.

What is claimed is:

1. An optical measurement device comprising:
    a light source configured to output a terahertz wave and coaxial light having a wavelength different from the wavelength of the terahertz wave, coaxially with the terahertz wave;
    an intensity modulation unit configured to perform intensity modulation of at least the terahertz wave of the terahertz wave and the coaxial light in a predetermined modulation frequency; and
    a light detection unit configured to synchronously detect each of the terahertz wave and the coaxial light which have acted on a measurement subject via the intensity modulation unit based on the modulation frequency.

2. The optical measurement device according to claim 1, wherein the intensity modulation unit has a switching portion configured to switch between a first attenuation region in which intensity of the coaxial light is attenuated and a second attenuation region in which intensity of the terahertz wave is attenuated with respect to optical axes of the terahertz wave and the coaxial light based on the modulation frequency.

3. The optical measurement device according to claim 1, further comprising:
    a light condensing lens configured to condense the terahertz wave and the coaxial light toward the intensity modulation unit.

4. The optical measurement device according to claim 1, further comprising:
    a reference signal generation unit configured to generate a first reference signal and a second reference signal of which phases are inverted with respect to each other, based on the modulation frequency,
    wherein the light detection unit has a first lock-in detection portion configured to perform lock-in detection of the terahertz wave based on the first reference signal and a second lock-in detection portion configured to perform performs lock-in detection of the coaxial light based on the second reference signal.

5. The optical measurement device according to claim 4, wherein the light source outputs the terahertz wave and the coaxial light in a repetition frequency higher than the modulation frequency, and
    wherein the light detection unit has a prelock-in detection portion configured to perform lock-in detection of the terahertz wave and the coaxial light in a part preceding the first lock-in detection portion and the second lock-in detection portion based on the repetition frequency.

6. The optical measurement device according to claim 1, wherein the intensity modulation unit includes
    a total reflection prism configured to have an input surface for the terahertz wave and the coaxial light, an output surface, and a total reflection surface positioned in an optical path between the input surface and the output surface, and
    a terahertz wave absorber configured to be disposed to face the total reflection surface and be swept based on the modulation frequency within a range in which a distance d to the total reflection surface satisfies dm<d≤dt when a leaching length of an evanescent wave of the terahertz wave on the total reflection surface is dt and a leaching length of an evanescent wave of the coaxial light on the total reflection surface is dm.

7. The optical measurement device according to claim 6, wherein the light source outputs the terahertz wave and the coaxial light in a repetition frequency higher than the modulation frequency,
    wherein the optical measurement device further includes a reference signal generation unit configured to generate a reference signal based on the modulation frequency, and
    wherein the light detection unit has a first lock-in detection portion configured to perform lock-in detection of the terahertz wave based on the reference signal and a second lock-in detection portion configured to perform lock-in detection of the coaxial light based on the repetition frequency.

8. The optical measurement device according to claim 1, wherein the coaxial light is mid-infrared light.

9. An optical measurement method comprising:
    outputting a terahertz wave and coaxial light having a wavelength different from the wavelength of the terahertz wave, coaxially with the terahertz wave;
    performing intensity modulation of at least the terahertz wave of the terahertz wave and the coaxial light in a predetermined modulation frequency; and
    synchronously detecting each of the terahertz wave and the coaxial light which have acted on a measurement subject via the intensity modulation based on the modulation frequency.

* * * * *